United States Patent
Redana et al.

(10) Patent No.: US 9,294,939 B2
(45) Date of Patent: Mar. 22, 2016

(54) METHOD AND APPARATUS FOR REDUCING INTERFERENCE

(75) Inventors: Simone Redana, Munich (DE); Erlin Zeng, Beijing (CN); Hai Ming Wang, Beijing (CN); Jing Han, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 252 days.

(21) Appl. No.: 13/805,372

(22) PCT Filed: Jun. 21, 2010

(86) PCT No.: PCT/CN2010/000898
§ 371 (c)(1),
(2), (4) Date: Feb. 11, 2013

(87) PCT Pub. No.: WO2011/160250
PCT Pub. Date: Dec. 29, 2011

(65) Prior Publication Data
US 2013/0137364 A1    May 30, 2013

(51) Int. Cl.
| | | |
|---|---|---|
| H04W 24/02 | (2009.01) | |
| H04B 7/155 | (2006.01) | |
| H04W 52/24 | (2009.01) | |
| H04W 52/46 | (2009.01) | |
| H04B 7/15 | (2006.01) | |

(52) U.S. Cl.
CPC ............... *H04W 24/02* (2013.01); *H04B 7/15* (2013.01); *H04B 7/15528* (2013.01); *H04W 52/243* (2013.01); *H04W 52/46* (2013.01)

(58) Field of Classification Search
CPC .. H04B 7/15; H04B 7/15528; H04B 7/15557; H04B 7/15564; H04B 7/15578; H04B 7/15585; H04B 15/00; H04B 15/005; H04B 15/02; H04B 15/025; H04B 15/04; H04W 24/02; H04W 52/243
USPC ............ 455/9, 10, 7, 436, 63.1, 67.13, 452.2, 455/512, 101, 522, 450, 187.1; 370/315, 370/252, 329, 335, 338, 331
See application file for complete search history.

(56) References Cited

U.S. PATENT DOCUMENTS

| | | | |
|---|---|---|---|
| 2008/0316968 A1* | 12/2008 | Sun et al. ...................... 370/331 |
| 2009/0053994 A1 | 2/2009 | Senarath et al. ............. 455/11.1 |
| 2009/0196245 A1* | 8/2009 | Ji .................................. 370/329 |
| 2009/0233544 A1* | 9/2009 | Oyman et al. .................... 455/7 |

(Continued)

FOREIGN PATENT DOCUMENTS

| | | |
|---|---|---|
| CN | 101192871 A | 6/2008 |
| CN | 101192872 A | 6/2008 |

OTHER PUBLICATIONS

R1-090026, 3GPP TSG RAN WG1 Meeting #55bis, Ljubljana, Slovenia, Jan. 12-16, 2009, "L2 Relay Interference Mitigation", Research in Motion, Limited, 6 pgs.

(Continued)

*Primary Examiner* — Tan H Trinh
(74) *Attorney, Agent, or Firm* — Harrington & Smith (57) ABSTRACT

A method includes receiving information relating to interference between a relay node associated with a first base station and at least one other relay node associated with a second base station. The method also includes initiating modifying transmitting parameters of the relay node and/or the at least one other relay node on the basis of the information.

18 Claims, 6 Drawing Sheets

(56) References Cited

U.S. PATENT DOCUMENTS

| | | | |
|---|---|---|---|
| 2010/0039947 A1* | 2/2010 | Li et al. | 370/252 |
| 2010/0069010 A1* | 3/2010 | Karakayali et al. | 455/63.1 |
| 2010/0118844 A1* | 5/2010 | Jiao et al. | 370/338 |
| 2010/0124880 A1* | 5/2010 | Wu et al. | 455/7 |
| 2010/0202391 A1* | 8/2010 | Palanki et al. | 370/329 |
| 2010/0316096 A1* | 12/2010 | Adjakple et al. | 375/211 |
| 2011/0103291 A1* | 5/2011 | Wiberg et al. | 370/315 |
| 2011/0199957 A1* | 8/2011 | Oyman et al. | 370/315 |
| 2011/0243060 A1* | 10/2011 | Mildh et al. | 370/315 |
| 2011/0319122 A1* | 12/2011 | Zhou et al. | 455/522 |
| 2012/0058719 A1* | 3/2012 | Gan et al. | 455/10 |
| 2012/0083275 A1* | 4/2012 | Tajima et al. | 455/436 |
| 2012/0218964 A1* | 8/2012 | Park et al. | 370/329 |
| 2012/0269113 A1* | 10/2012 | Park et al. | 370/315 |
| 2012/0320816 A1* | 12/2012 | Kim et al. | 370/315 |
| 2013/0034043 A1* | 2/2013 | Yu et al. | 370/315 |
| 2013/0155983 A1* | 6/2013 | Choi et al. | 370/329 |

OTHER PUBLICATIONS

R1-090790, 3GPP TSG RAN WG! Meeting #56, Athens, Greece, Feb. 9-13, 2009, "Consideration on Resource Allocation for Relay Backhaul Link", LG Electronics, 5 pgs.

* cited by examiner

METHOD AND APPARATUS FOR REDUCING INTERFERENCE

This disclosure relates to a method and apparatus for reducing interference. In particular the disclosure relates to reducing interference between relay nodes in a communication system.

A communication system can be seen as a facility that enables communication sessions between two or more entities such as mobile communication devices and/or other stations associated with the communication system. A communication system and a compatible communication device typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. Examples of wireless systems include public land mobile networks (PLMN), satellite based communication systems and different wireless local networks, for example wireless local area networks (WLAN). In wireless systems an access node is provided by a base station. The radio coverage area of a base station is known as a cell, and therefore the wireless systems are often referred to as cellular systems. In some systems a base station access node is called Node B or an enhanced Node B (eNB).

A user can access the communication system by means of an appropriate communication device. A communication device of a user is often referred to as user equipment (UE). A communication device is provided with an appropriate signal receiving and transmitting arrangement for enabling communications with other parties. A communication device may be arranged to communicate, for example, data for carrying communications such as voice, electronic mail (email), text message, multimedia, for enabling internet access and so on. Users may thus be offered and provided numerous services via their communication devices. The communication connection can be provided by means of one or more data bearers.

$3^{rd}$ Generation Partnership Project (3GPP) is standardizing an architecture that is known as the long-term evolution (LTE) of the Universal Mobile Telecommunications System (UMTS) radio-access technology. The aim is to achieve, inter alia, reduced latency, higher user data rates, improved system capacity and coverage, and reduced cost for the operator. A further development of the LTE is referred to herein as LTE-Advanced. The LTE-Advanced aims to provide further enhanced services by means of even higher data rates and lower latency with reduced cost. The various development stages of the 3GPP LTE specifications are referred to as releases.

Since the new spectrum bands for international mobile telecommunications (IMT) contain higher frequency bands and LTE-Advanced is aiming at a higher data rate, coverage of one base station may be limited due to the high propagation loss and limited energy per bit. Relaying using additional relay nodes has been proposed as a possibility to enlarge the coverage.

Some relay node communicate with an eNB over a backhaul link and with a user equipment over an access link. One proposed relay node for a LTE-A network is a type 1 relay node. The type 1 relay node is an inband relay node which uses the same frequency band for the backhaul link and the access link. The backhaul link and the access link of the type 1 relay node are time multiplexed. This means that the relay node may not communicate with the eNB and the user equipment simultaneously.

When more than one relay node transmits on the backhaul link and/or the access link at the same time, interference may arise between relay nodes. A known method of alleviating interference is to align a plurality of relay nodes to transmit and receive in different sub-frames. However effectiveness of aligning transmission of a plurality of relay nodes in particular sub-frames may be less as the number of relay nodes increases. Furthermore the system information may not be sufficient to suppress interference between the relay nodes.

Embodiments of the invention aim to address one or several of the above issues.

In accordance with an embodiment there is provided a method comprising receiving information relating to interference between a relay node associated with a first base station and at least one other relay node associated with a second base station; and initiating modifying transmitting parameters of the relay node and/or the at least one other relay node on the basis of the information.

Preferably the method comprises sending the information relating to the interference to the second base station. More preferably the second base station is a neighbouring base station to the first base station. Alternatively, the second base station is a base station remote from the first base station, but relay nodes associated with the second base station interfere with relay nodes associated with the first base station.

Preferably the method comprises receiving/transmitting from/to the second base station information relating to backhaul sub-frame configuration set of the relay node and at least one other relay node Preferably the method comprises receiving from the second base station information relating to interference between the relay node and at least one relay node associated with the second base station.

Preferably the method comprises determining on the basis of the information relating to interference instructions for modifying transmitting parameters of the relay node and/or the at least one other relay node.

Preferably the initiating modifying comprises sending to the relay node and/or the at least one other relay node instructions for modifying the transmitting parameters.

Preferably the instructions comprises one or more of the following: modifying the transmission power of at least one relay node and stopping transmission for at least one relay node.

Preferably the information relating to interference comprises on or more of the following; average received interference between the relay node and the at least one other relay node, expected interference between the relay node and the at least one other relay node and transmission power of the relay node.

Preferably the information comprises interference measurements between the relay node and the at least one other relay node.

Preferably the interference measurements are performed in a common relay and/or specific relay frequency-time domain resource.

Preferably the method comprises initiating measuring of the interference between the relay node and the at least one other relay node.

Preferably the initiating the measuring comprises sending a measuring instruction to the relay node or initiating the measuring at the relay node.

Preferably the method comprises sending to the second base station information regarding at least one relay node associated with the first base station for determining station information relating to interference between the relay node and at least one relay node associated with the second base station.

In accordance with yet another embodiment there is provided a apparatus comprising: a processor; memory including computer program code; the memory and the computer program code configured to, with the processor, cause the apparatus to perform at least the following: receive at information relating to interference between a relay node associated with a first base station and at least one other relay node associated with a second base station; and initiate modifying transmitting parameters of the relay node and/or the at least one other relay node on the basis of the information.

Preferably the apparatus is configured to send the information relating to the interference to the second base station.

Preferably the apparatus is configured to receive/transmit from/to the second base station information relating to backhaul sub-frame configuration set of the relay node and at least one other relay node Preferably the apparatus is configured to receive from the second base station information relating to interference between the relay node and at least one relay node associated with the second base station.

Preferably the apparatus is configured to determine on the basis of the information relating to interference instructions for modifying transmitting parameters of the relay node and/or the at least one other relay node.

Preferably the apparatus is configured to initiate modifying by sending to the relay node and/or the at least one other relay node instructions for modifying the transmitting parameters.

Preferably the instructions comprises one or more of the following: modifying the transmission power of at least one relay node and stopping transmission for at least one relay node.

Preferably the information relating to interference comprises on or more of the following; average received interference between the relay node and the at least one other relay node, expected interference between the relay node and the at least one other relay node and transmission power of the relay node.

Preferably the information comprises interference measurements between the relay node and the at least one other relay node.

Preferably the apparatus is configured to perform interference measurements in a common relay and/or specific relay frequency-time domain resource.

Preferably the apparatus is configured to initiate measuring of the interference between the relay node and the at least one other relay node.

Preferably the apparatus is configured to initiate the measuring by sending a measuring instruction to the relay node or initiating the measuring at the relay node.

Preferably the apparatus is configured to send to the second base station information regarding at least one relay node associated with the first base station for determining station information relating to interference between the relay node and at least one relay node associated with the second base station.

In accordance with another embodiment there is provided a method comprising sending information relating to interference between a relay node and at least one other relay node; and receiving instructions to modify transmitting parameters at the relay node.

Preferably the method comprises modifying the transmitting parameters at the relay node on the basis of the instructions.

Preferably the modifying comprises one or more of the following modifying the transmission power of at least one relay node and stopping transmission for at least one relay node.

Preferably the modifying the transmission power comprises reducing the transmission power of the relay node from an original power level to a target power level.

Preferably the modifying the transmission power comprises incrementally increasing the transmission power from the target power level to the original power level.

Preferably the information relating to interference between a relay node and at least one other relay node comprises interference measurements.

Preferably the method comprises measuring the interference between the relay node and the at least one other relay node in response to receiving a measuring instruction at the relay node or initiating the measuring at the relay node.

In accordance with yet another embodiment there is provided an apparatus comprising: a processor; memory including computer program code; the memory and the computer program code configured to, with the processor, cause the apparatus to perform at least the following: send information relating to interference between a relay node associated with a first base station and at least one other relay node associated with a second base station; and receive instructions to modify transmitting parameters at the relay node.

Preferably the apparatus is configured to modify the transmitting parameters at the relay node on the basis of the instructions.

Preferably the apparatus is configured to modify one or more of the following the transmission power of at least one relay node and stopping transmission for at least one relay node.

Preferably the apparatus is configured to reduce the transmission power of the relay node from an original power level to a target power level.

Preferably the apparatus is configured to incrementally increase the transmission power from the target power level to the original power level.

Preferably the information relating to interference between a relay node and at least one other relay node comprises interference measurements.

Preferably the apparatus is configured to measure the interference between the relay node and the at least one other relay node in response to receiving a measuring instruction at the relay node or initiating the measuring at the relay node.

In accordance with yet another embodiment there is provided a apparatus comprising: means for receiving information relating to interference between a relay node associated with a first base station and at least one other relay node associated with a second base station; and means for initiating modifying transmitting parameters of the relay node and/or the at least one other relay node on the basis of the information.

Preferably the apparatus comprises means for sending the information relating to the interference to the second base station.

Preferably the apparatus comprises means for receiving/transmitting from/to the second base station information relating to backhaul sub-frame configuration set of the relay node and at least one other relay node Preferably the apparatus comprises means for receiving from the second base station information relating to interference between the relay node and at least one relay node associated with the second base station.

Preferably the apparatus comprises means for determining on the basis of the information relating to interference instructions for modifying transmitting parameters of the relay node and/or the at least one other relay node.

Preferably the apparatus comprises means for initiating modifying by sending to the relay node and/or the at least one other relay node instructions for modifying the transmitting parameters.

Preferably the apparatus comprises means for performing interference measurements in a common relay and/or specific relay frequency-time domain resource.

Preferably the apparatus comprises means for initiating measuring of the interference between the relay node and the at least one other relay node.

Preferably the apparatus comprises means for sending to the second base station information regarding at least one relay node associated with the first base station for determining station information relating to interference between the relay node and at least one relay node associated with the second base station.

In accordance with yet another embodiment there is provided an apparatus comprising: means for sending information relating to interference between a relay node and at least one other relay node; and means for receiving instructions to modify transmitting parameters at the relay node.

Preferably the apparatus comprises means for modifying the transmitting parameters at the relay node on the basis of the instructions.

Preferably the apparatus comprises means for modifying one or more of the following the transmission power of at least one relay node and stopping transmission for at least one relay node.

Preferably the apparatus comprises means for reducing the transmission power of the relay node from an original power level to a target power level.

Preferably the apparatus comprises means for incrementally increasing the transmission power from the target power level to the original power level.

Preferably the apparatus comprises means for measuring the interference between the relay node and the at least one other relay node in response to receiving a measuring instruction at the relay node or initiating the measuring at the relay node.

A computer program comprising program code means adapted to perform the method may also be provided.

Various other aspects and further embodiments are also described in the following detailed description and in the attached claims.

The invention will now be described in further detail, by way of example only, with reference to the following examples and accompanying drawings, in which.

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIG. 1 to assist in understanding the technology underlying the described examples.

A communication device can be used for accessing various services and/or applications provided via a communication system. In wireless or mobile communication systems the access is provided via a wireless access interface between mobile communication devices 11 and an appropriate access system 10. A mobile device 11 can typically access wirelessly a communication system via at least one base station 12a, 12b or similar wireless transmitter and/or receiver node of the access system 10. One or more base stations 12a, 12b may communicate via an X2 interface. The X2 interface may be a direct physical link or may be provided by a data network to which both the base stations are in communication. A base station site 12a, 12b typically provides one or more cells of a cellular system. In the FIG. 1 example the base station 12a, 12b is configured to provide a cell, but could provide, for example, three sectors, each sector providing a cell. Each mobile device 11a, 11b, 11c and base station 12a, 12b may have one or more radio channels open at the same time and may receive signals from more than one source.

Figure 1:
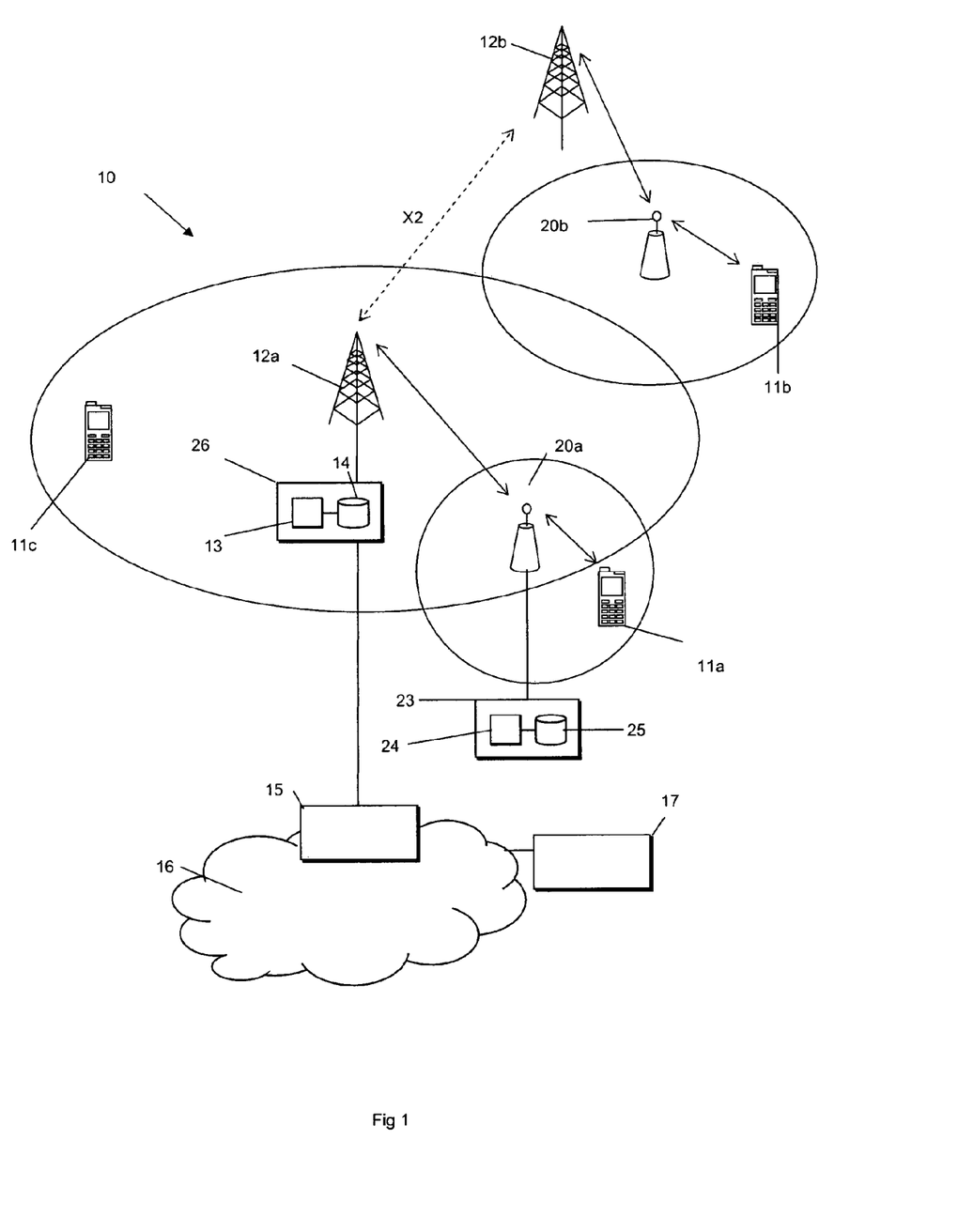
FIG. 1 shows an example of a communication system in some embodiments.

A base station 12a, 12b is typically controlled by at least one appropriate controller so as to enable operation thereof and management of mobile communication devices in communication with the base station. The control entity can be interconnected with other control entities. In FIG. 1 the controller is shown to be provided by block 26. An appropriate controller apparatus 26 may comprise at least one memory 14, at least one data processing unit 13 and an input/output interface. The controller 26 is thus typically provided with memory capacity and at least one data processor 13. It shall be understood that the control functions may be distributed between a plurality of controller units. The controller apparatus 13 for the base station 12a, 12b may be configured to execute an appropriate software code to provide the control functions as explained below in more detail.

In the FIG. 1 example the base station node 12a, 12b is connected to a data network 16 via an appropriate gateway 15. A gateway function between the access system and another network such as a packet data network may be provided by means of any appropriate gateway node, for example a packet data gateway and/or an access gateway 17. A communication system may thus be provided by one or more interconnect networks and the elements thereof, and one or more gateway nodes may be provided for interconnecting various networks.

Alternatively a mobile device 11a, 11b can typically access the communication system 10 via at least one relay 20a, 20b. The relay nodes 20a, 20b may extend the cell coverage and enhance cell capacity for the communication system. FIG. 1 shows a first relay nodes 20a attached to a first base station 12a and a second relay node 20b attached to a second base station 12b. In some embodiment, the base station 12a may have one or more relay nodes associated therewith. For the purposes of clarity base stations in FIG. 1 12a, 12b are in communication with one relay node 20a, 20b respectively.

The relay node 20a, 20b may be controlled by at least one controller apparatus 23 to provide operation and management of communication devices 11a, 11b in communication with the relay nodes 20a, 20b. The controller apparatus 23 is shown in FIG. 1 connected to relay node 20a. The controller apparatus 23 may comprise at least one data processor 24 connected to a memory 25. The controller apparatus 23 for the relay node 20a may be configured to execute an appropriate software code to provide the control functions as explained below in more detail.

A communication device 11a, 11b, 11c can be used for accessing various services and/or applications. The communication devices can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. A non-limiting example of mobile architectures where the herein described principles may be applied is known as the Evolved Universal Terrestrial Radio Access Network (E-UTRAN).

Non-limiting examples of appropriate access nodes are a base station of a cellular system, for example what is known as NodeB or enhanced NodeB (eNB) in the vocabulary of the 3GPP specifications. The eNBs may provide E-UTRAN features such as user plane Radio Link Control/Medium Access Control/Physical layer protocol (RLC/MAC/PHY) and control plane Radio Resource Control (RRC) protocol terminations towards mobile communication devices. Other examples include base stations of systems that are based on technologies such as wireless local area network (WLAN) and/or WiMax (Worldwide Interoperability for Microwave Access).

An appropriate mobile communication device may be provided by any device capable of sending and receiving radio signals. Non-limiting examples include a mobile station (MS) such as a mobile phone or what is knows as a 'smart phone', a portable computer provided with a wireless interface card or other wireless interface facility, personal data assistant (PDA) provided with wireless communication capabilities, or any combinations of these or the like.

Figure 2:
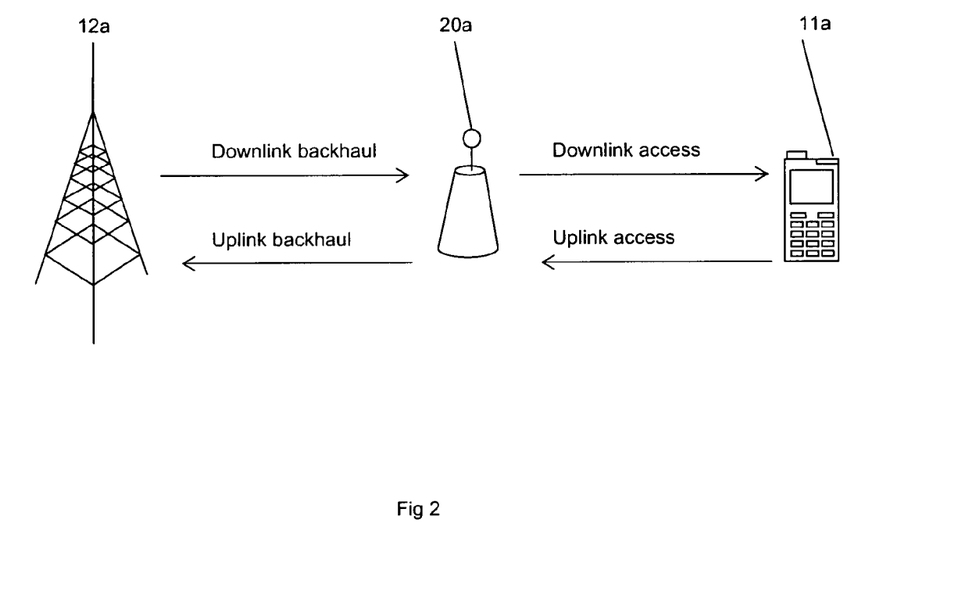
FIG. 2 shows an example of a relay node transmitting and receiving with a base station and a communication device.

The relay node 20a, 20b will now be described in further detail with reference to FIG. 2. FIG. 2 shows an example of a relay node 20a transmitting and receiving with a base station 12a and a communication device 11a.

The relay node 20a communicates with the base station 12a over a backhaul link and communicates with a communication device 11a over an access link. When data is to be transmitted from the base station 12a to the communication device 11a data is sent via the relay node 20a over the downlink backhaul channel. The relay node 20a having received the data from the base station 12a transmits the data to the communication device 11a via a downlink access channel. At some point the communication device 11a may transmit data to the base station 12a via the relay node 20a. The relay node 20a receives data from the communication device 11a via an uplink access channel. On receiving the data via the uplink access channel the relay node 20a transmits the data to the base station 12a via uplink backhaul channel.

In some embodiments the relay node 20a may be a type 1 relay node which uses the same frequency band for the backhaul link and the access link. The backhaul link transmissions and the access link transmissions of the relay node 20a are time multiplexed which means the relay node 20a cannot communicate simultaneously with the communication device 11 and the base station 12a.

The separation of time multiplexing for the access link and the backhaul link transmissions is explained with reference to FIG. 3 which shows time separation of transmissions on the access link the backhaul link.

Figure 3:
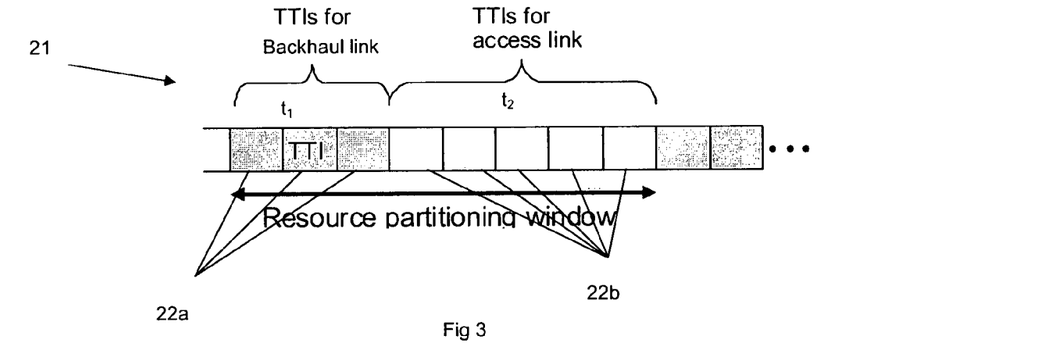
FIG. 3 shows an example of time separation of access link transmission and backhaul link transmissions.

FIG. 3 shows a frame 21 for transmitting data or receiving data at the relay node 20a. The frame 21 is partitioned into a plurality of sub-frames or transmission time intervals (TTIs) 22. At a first time $t_1$ the sub-frames comprise data for the backhaul link and at a second time $t_2$ the sub-frames comprise data for the access link. In this way, in downlink the relay node 20a can only receive data for the backhaul link when the relay node 20a is not transmitting data for the access link and vice versa in uplink. This means a communication system which comprises a plurality of relay nodes may experience interference between relay nodes.

Figure 4:
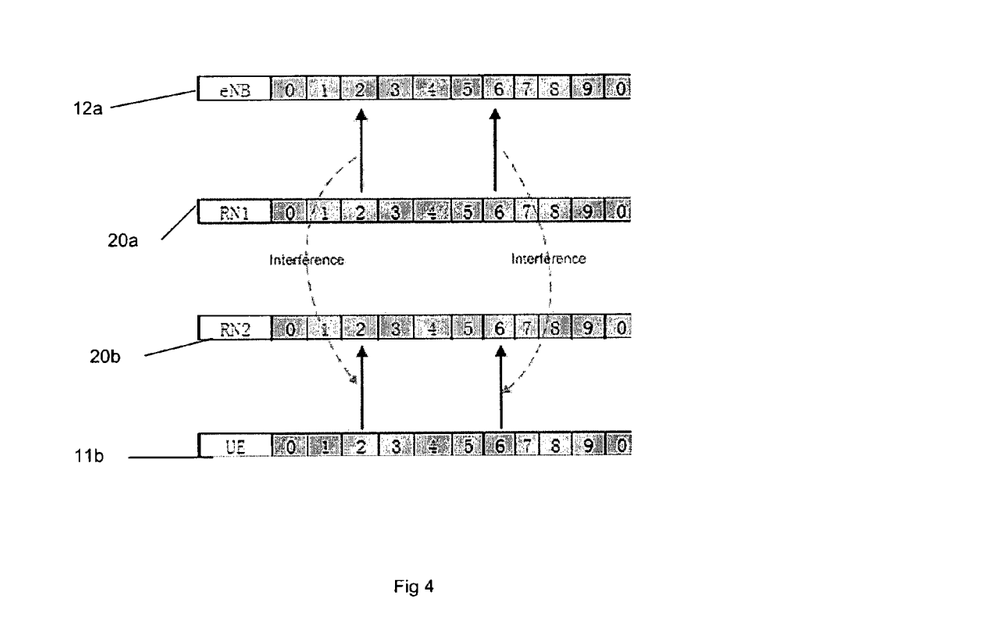
FIG. 4 shows an example of interference between relay nodes.
Figure 5:
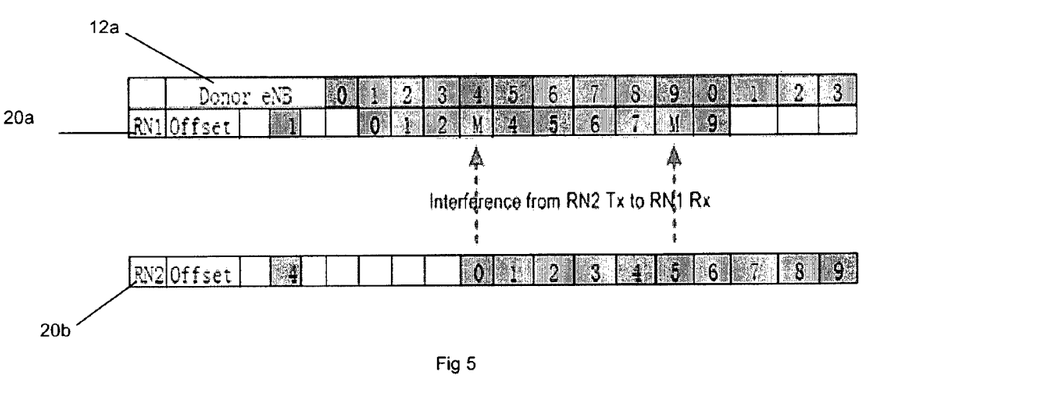
FIG. 5 shows an example of interference between relay nodes.

Examples of interference between relay nodes will now be described in further detail with FIGS. 4 and 5. FIGS. 4 and 5 show examples of interference between multiple relay nodes in a communication system.

The communication system 10 comprises a first relay node 20a and a second relay node 20b. The different relay nodes have different backhaul sub-frame configurations. The means that there may be potential interference between the relay nodes 20a, 20b when the first relay node 20a is in a transmitting mode and the second relay node 20b is in a receiving mode or vice versa. The transmitting mode of the relay node 20a is when the relay node transmits data to the communication device 11a on the downlink access channel or when the relay node 20a transmits data to the first base station 12a on the uplink backhaul channel. The receiving mode for the relay node 20a is when the relay node 20a receives data from the communication device 11a on the uplink access channel or when the relay node 20a receives data from the first base station 12a on the downlink backhaul channel. Likewise the second relay node 20b has a receiving mode and a transmitting mode.

Referring to FIG. 4 the first relay node 20a transmits to the first base station 12a in sub-frames 2 and 6. At the same time the second relay node 20b receives data from the communication device 11b in sub-frame 2 and sub-frame 6 as well. This means that the second relay node 20b may experience interference from the data transmitted by the first relay node 20a to the first base station 12a in the uplink backhaul.

FIG. 5 describes another scenario whereby the first relay node 20a experiences interference from the second relay node 20b. In some communication systems the first base station 12a may not be synchronised with other base stations, for example the second base station 12b, or the first or second relay nodes 20a, 20b. The first and second relay nodes 20a and 20b may experience interference between each other if there is a timing offset between the transmissions from the first and second relay nodes 20a, 20b.

FIG. 5 shows a first relay node 20a having a one millisecond offset to a first base station 12a and a second relay node 20b having a four millisecond offset to the first base station 12a. The first relay node 20a is configured to be in a receiving mode and is configured to be MBSFN SF for the data transmission from the first base station 12a in sub-frames 3 and 8 of the first relay node 20a. In some embodiments the MBSFN sub-frame is used to create a gap for downlink backhaul transmission for relay. In reference to FIG. 4, the MBSFN sub-frame M occurs in sub-frames 3 and 8 of the first relay node 20a wherein a downlink backhaul transmission is carried out.

In FIG. 4 sub-frames 1 to 3, 6 to 8 of the first relay node 20a, are non-MBSFN sub-frames which are not configured to carry out downlink backhaul transmission. The other sub-frames 0, 4, 5 and 9, are sub-frames which can be configured as MBSFN sub-frame and can carry out downlink backhaul transmissions.

The second relay node 20b is configured to transmit data from the relay node 20b to an attached communication device 11b in sub-frames 0 and 5 of the second relay node 20b. The trans-mission from the second relay node 20b in sub-frame 0 and sub-frame 5 will interfere with the first relay node 20a receiving data transmissions from the first base station 12a in sub-frames 3 and 8 since sub-frames 0 and 5 of the second relay node 20b coincide with sub-frames of 3 and 8 of the first relay node 20a.

Interference can occur when relay nodes are in a backhaul receiving mode while other relay nodes are in a transmitting mode for the access link or when the relay nodes are in access receiving mode while other relay nodes are in transmitting mode for the backhaul link. Due to small inter site distance (ISD) amongst relay nodes and the complexity in site planning this interference can contribute to a significant amount of interference for relay nodes in a communication system.

Figure 6:
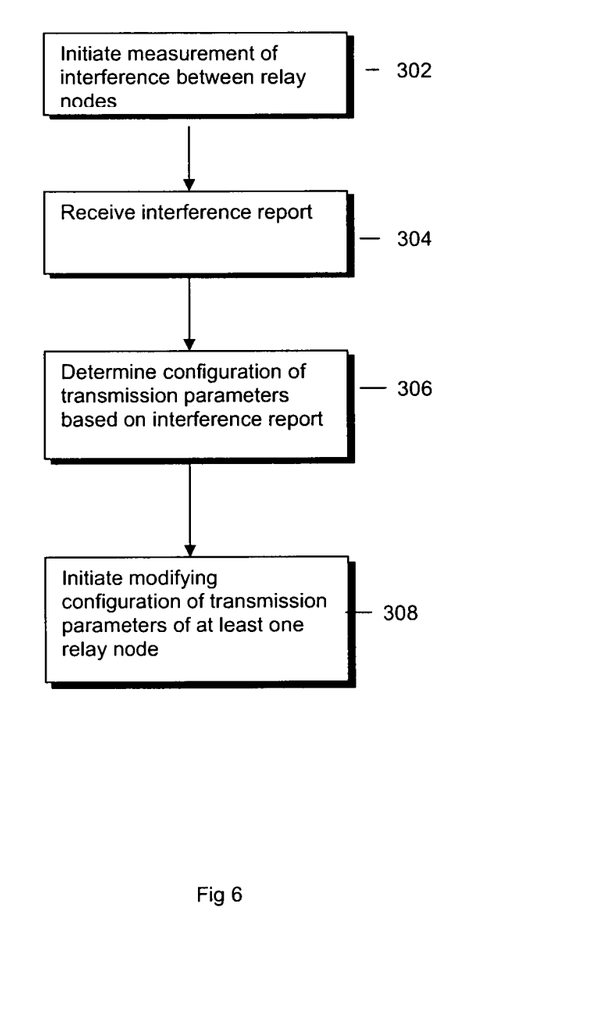
FIG. 6 shows a flowchart of some embodiments.

FIG. 6 illustrates a flowchart of some embodiments for addressing interference between relay nodes.

Measurements of the interference between relay nodes 20a and 20b in a communication system is initiated as shown in block 302. In some embodiments the measurement of interference between relay nodes is initiated by processor 13 of the first base station 12a. Alternatively, measurement of the interference between the relay nodes is initiated by the first relay node 20a itself. The measurement of interference between first and second relay nodes 20a and 20b is triggered by an event. In some embodiments the measurement of interference between relay nodes is triggered by receiving a request message at the first relay node 20a or by another means such as a timer or an indication in a sub-frame.

After measurement of the interference between relay nodes 20a, 20b has been carried out, the base station 12a receives an interference report from the first relay node 20a. The interference report in some embodiments comprises measurements of the average received interference from one or more interfering relay nodes. The first base station 12a may receive additional interference reports from neighbouring relay nodes. The interference reports from neighbouring relay nodes may be sent from the second base station 12b via a base station interface X2.

In some embodiments the first base station 12a may receive interference reports from neighbouring base stations, for example the second base station 12b, in response to a request from the base station 12a. In alternative embodiments the first base station 12a may store interference reports from neighbouring relay nodes 20b in memory 14.

In response to receiving the interference reports from the relay node 20a and/or interference reports from neighbouring base stations 12b, the processor 13 of the first base station 12a determines a configuration of transmission parameters of one or more relay nodes based on the interference report as shown in step 306.

The processor 13 of the first base station 12a initiates modifying the configuration of the transmission parameters as shown in step 308. In some embodiments the initiation may be carried out by sending an instruction to the first relay node 20a to change the configuration of the transmission parameters. The instruction sent from the first base station 12a to the first relay node 20a causes the first relay node 20a to change its transmission parameters. For example the first relay node 20a changes the power level at which it transmits data on the backhaul link and/or the access link in response the instruction.

Figure 7:
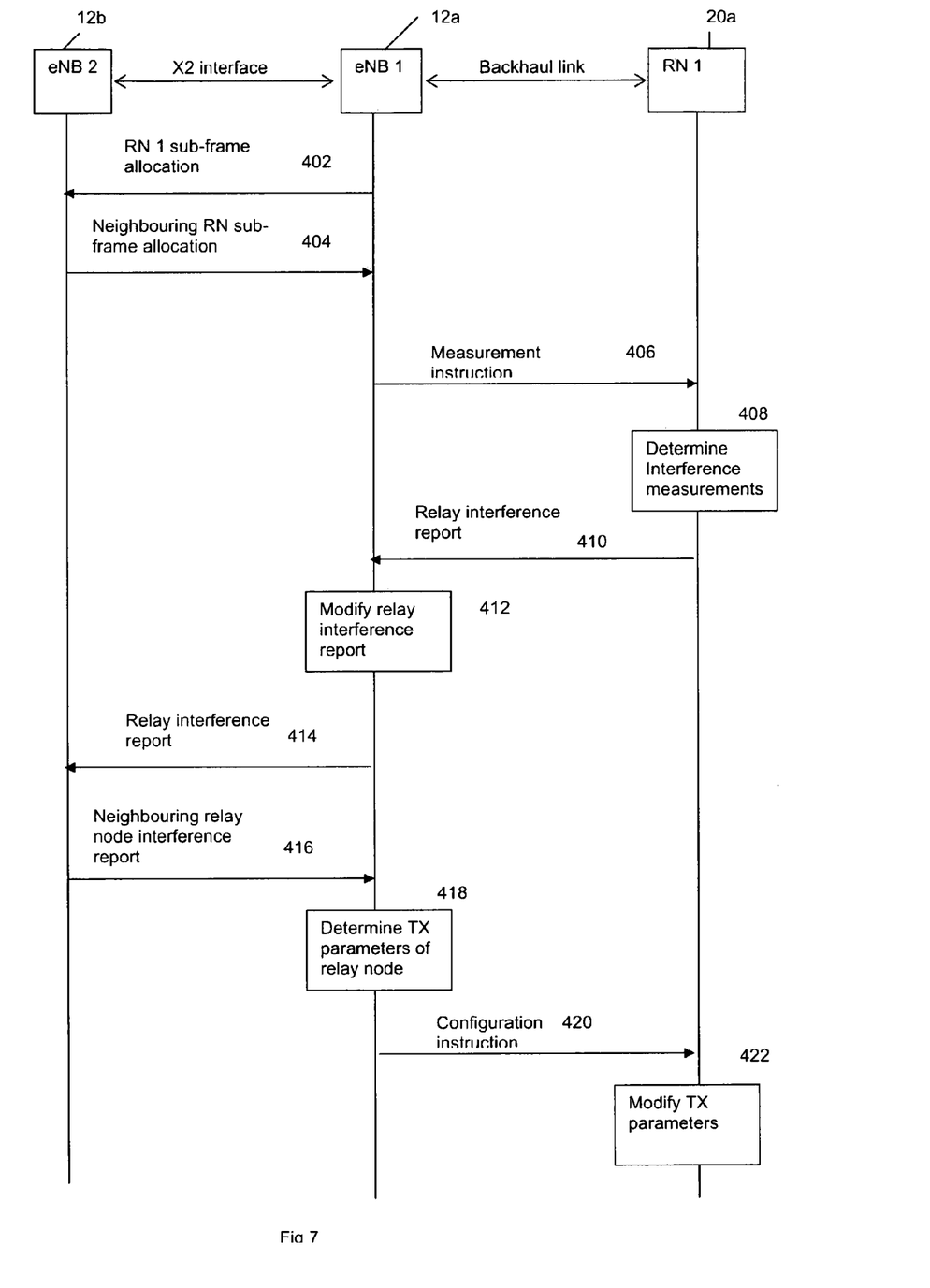
FIG. 7 shows a signalling flow for some embodiments.
Figure 8:
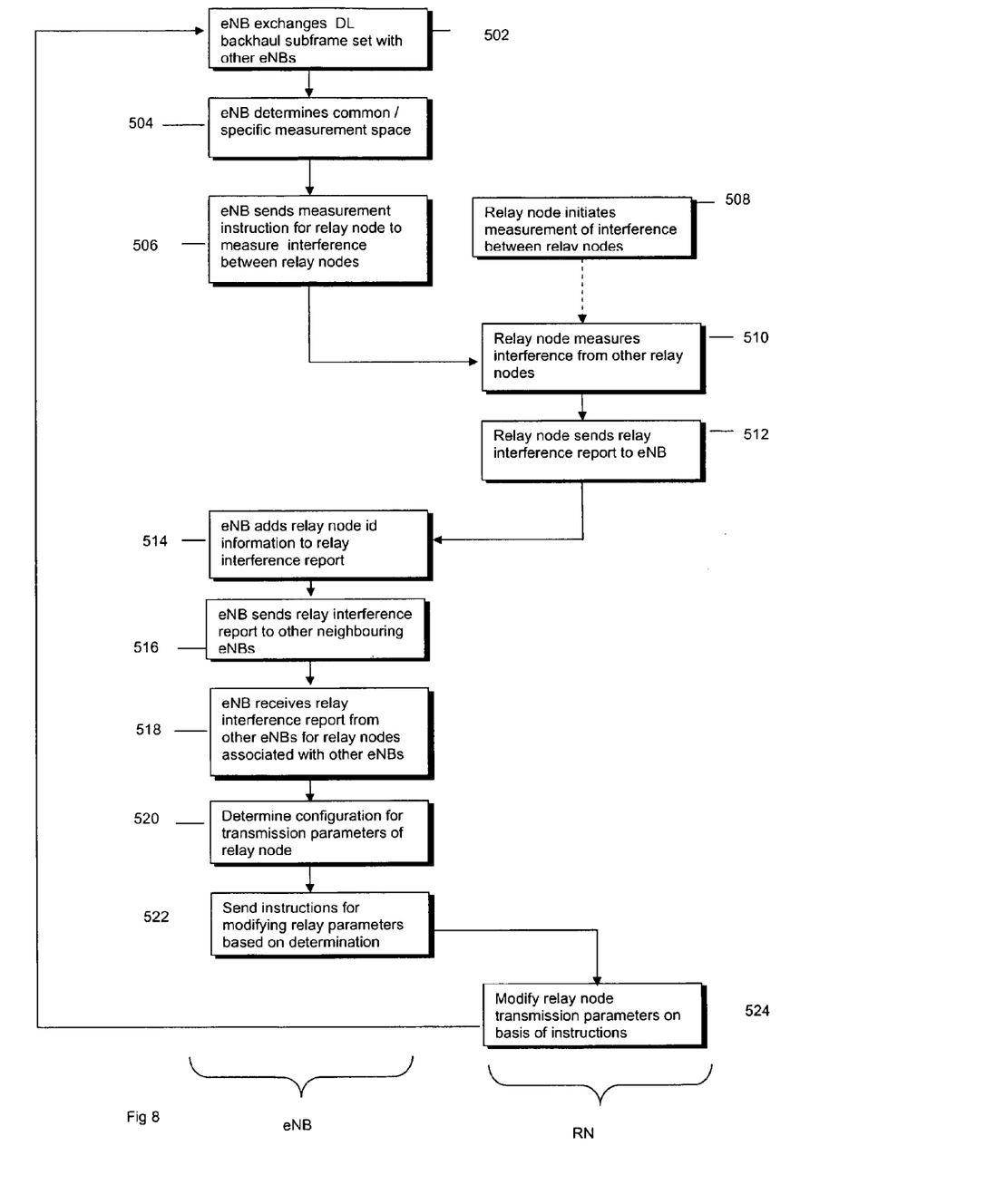
FIG. 8 shows a flowchart of some other embodiments.

Some embodiments will now be described with reference to FIGS. 7 and 8. FIG. 7 discloses a signalling diagram between a first relay node 20a and first and second base stations 12a, 12b. FIG. 8 discloses a flow diagram according to some embodiments for mitigating interference between relay nodes.

The first base station 12a exchanges a downlink backhaul sub-frame set with the second base station 12b as shown in step 502 of FIG. 8. The first base station 12a sends the downlink backhaul sub-frame set to the second base station 12b over the X2 interface. The downlink backhaul sub-frame set comprises scheduling information of when relay nodes associated with the base station 12a are transmitting.

The first base station 12a sends the scheduling information to the second base station 12b as shown in step 402 of FIG. 7. The message comprises sub-frame allocation for one or more relay nodes associated with the base station 12a.

In some embodiments, In response to receiving the information comprising the sub-frame allocation of relay nodes associated with the first base station 12a, the first base station 12a receives scheduling information from the second base station 12b as shown in step 404 of FIG. 7. In some other embodiments, information comprising the sub-frame allocation of relay nodes is only sent from one base station to another base station. A base station may not take any action, for example sending scheduling information in response to receiving scheduling information because the base station may not have received interference measurements.

For example, in some embodiments the first base station 12a sends the scheduling information to the second base station 12b. The second base station sends interference measurements to the first base station 12a and on the basis thereof the first base station initiates changing the transmission parameters.

The processor 13 of the first base station 12a determines the common and/or specific measurement space for measuring the interference between relay nodes as shown in step 504. In particular, the first base station 12a determines the scheduling of transmission from one or more relay nodes and the frequencies on which the relay nodes 20a, 20b are using. In this way, the base station 12a determines how the radio resources are used by the relay nodes 20a, 20b in terms of time resources and frequency resources. The common measurement space refers to the common time and/or frequency resources that are measured by a plurality of relays. In some embodiments the measurement of the common time and/or frequency resources is configured by a common signalling to the plurality of relays. The specific space refers to different time and/or frequency resources measured by different relays.

The first base station 12a based on the relay node sub-frame allocation information received from the second base station 12b, can configure its associated relay nodes 20a to measure the interference on sub-frames which are not being used by relay nodes associated with the first base station 12a. In this way, the first base station 12a can instruct the first relay node 20a to measure interference arising from the second relay node associated with the second base station 12b. Additionally or alternatively, the second relay node 20b can also measure the interference due to the first relay node 20a at the same time, or at another time. In some embodiments, both the first and the second base stations will send downlink sub-frame set information to each other. In other embodiments additional base stations will exchange downlink sub-frame set information with each other and the first and second base stations.

In some embodiments the common measurement space is configured in terms of sub-frames and physical resource block sets. In some embodiments, the measurement space is configured in the time-frequency resource and the physical resource block is the resource in the frequency domain.

After the processor 13 of the first base station 12a has determined the common/specific measurement space, the first base station 12a sends a measurement instruction to the first relay node 20a as shown in step 406 of FIGS. 7 and 506 of FIG. 8. In this way, the processor 13 of base station 12a initiates measurement of the interference between relay nodes at the first relay node 20a.

In some other embodiments, the first base station 12a does not initiate the measurement of interference but the first relay node 20a initiates measurement of the interference between relay nodes as shown in step 508 of FIG. 8. The first relay node 20a may initiate measurement of the interference between relay nodes in response to a trigger. The trigger may be for example a timer or a predetermined event.

In response to the instruction for measuring the interference the first relay node 20a measures interference from one or more other relay nodes as shown in step 510 of FIG. 8. The first relay node 20a measures the interference on the basis of measured reference signal quality or measured data channel quality.

The first relay node 20a measures the interference from the second relay node 20b in accordance with the configured measurement space. This means that the relay node 20a receives signals from the second relay node 20b when the second relay node 20b is transmitting data either to the second base station 12b or the communication device 11b. The first relay node 20a determines the power level of the second relay node 20b and in turn the signal or channel quality. Typically the relay nodes measure the interference based on a reference signal or a data channel which is configured in the measurement space. The relay nodes can then measure received signals from other relays with stored reference signals or a data channel. The relay node may use neighbouring cell measurements reference signal received power (RSRP) and reference signal received quality (RSRQ) within the configured measurement space.

The first relay node 20a receives information relating to the measurement space from the first base station 12a. The measurement space information may be included in the measurement instruction as shown in step 406. Alternatively in some embodiments, the base station may have previously sent information relating to the measurement space information and the first relay node 20a may store the measurement space information in memory 25.

The first relay node 20a receives the signals from the second relay node 20b and the processor 24 of the first relay node 20a determines the interference from other relay nodes at the first relay node 20a.

The processor 24 of the first relay node 20a determines the average received interference at the relay node for a specific sub-frame or an entire frame, for specific physical resource blocks for the entire bandwidth. The processor 24 can provide more detailed information of the interference such as the average received information for a specific physical resource block and interference values for downlink and uplink channels.

Furthermore, the processor 24 of the first relay node 20a can determine expected interference from one or more relay nodes 20b. The processor 24 of the first relay node 20a may determine more detailed expected interference information such as expected interference information for specific sub-frames, for the downlink and/or uplink channel together or separately. In some embodiments the processor 24 determines the expected interference based on the first relay node 20a previous experienced data reception. For example the processor can determine the expected interference based on used modulation and code rates (MCS) required signal to interference noise ratio (SINR) for data transmission, i.e. the required link quality, achieved SINR, i.e. the reached SINR by the current link quality, and received interference.

The processor 24 of the first relay node 20a may also determine the transmission power of the first relay node 20a. The transmission power may be the power of transmissions to the first base station 12a and/or to the communication device 11a. The processor 24 of the first relay node 20a determines the interference measurements as shown in step 408 of FIG. 7.

The processor 24 of the first relay node 20a then compiles a relay interference report based on the determined relay node interference measurements and sends the relay interference report to the first base station 12a as shown in steps 410 of FIG. 7 and step 512 of FIG. 8. The relay interference report received at the first base station 12a from the first relay node 20a may receive one or more of the following average received interference, expected interference and relay node downlink transmission power. The relay node interference report may further comprise information relating to the expected interference in terms of specific physical resource blocks and specific sub-frames for both downlink bands and uplink bands.

After the first base station 12a receives the relay node interference report the base station 12a adds a relay index to the reports. The relay index provides a unique identification for each relay node in order to determine between a plurality of relay node interference reports received from more than one relay node. The step of adding the relay node identification information to the relay interference report is shown in step 514 and 412.

The relay node index information is used by neighbouring base stations 12b to determine which relay node should be sent instructions if a relay node 20a associated with the first base station 12a is determined by neighbouring relay nodes 20b to cause interference with the neighbouring relay node. This means the first base station 12a can determine which relay node requires modification of transmission parameters on the basis of the interference information from the neighbouring base stations.

The first base station 12a then sends the relay interference report to second base station 12b on the X2 interface as shown in steps 414 and 516.

In some embodiments, in response to sending the relay interference report to the second base station 12b, the first base station 12a receives relay node interference reports for neighbouring relay nodes from the second base station 12b as shown in steps 416 and 518. In other embodiments, the relay interference report is only sent from one base station to the other base station. For example in some circumstances a base station may not need to send information to the other base station such as the interference information may not need to be updated.

The processor 13 of the first base station 12a determines on the basis of the relay node interference reports the configuration for transmission parameters of the relay node 20a. If the processor 13 determines on the basis of the relay interference report from the relay node 20a or neighbouring node interference reports received from the second base station 12b that the first relay node 20a is an interfering relay node, the processor 13 initiates modifying the configuration of the transmission parameters of the first relay node 20a.

The step of determining configuration of the transmission parameters for the relay node is shown in steps 418 and 520.

The processor 13 may determine that the first relay node 20a interferes with other neighbouring relay nodes. If the processor 13 determines that the first relay node 20a is an interfering relay node, the processor 13 generates instructions for the relay node 20a to reduce the interference caused by the first relay node 20a. In some embodiments the instructions comprise lowering the downlink transmission power on specific physical resource blocks of specific sub-frames. The processor 13 in some embodiments determines that the first relay node 20a is causing interference to other neighbouring relay nodes if the average received interference at the other neighbouring relay nodes 20b is above a certain level.

The processor 13 alternatively can instruct the first relay node 20a to prohibit the physical resource blocks at a specific sub-frame for the first relay node 20a. The processor 13 may determine that the first relay node 20a is significantly interfering with other neighbouring relay nodes 20b based on whether the expected interference report from the neighbouring relay nodes 20b is above a certain level.

In some other embodiments the instructions additionally or alternatively comprise other instructions for modifying the transmission parameters of the first relay node 20a to reduce the amount of interference caused by the first relay node. The processor 13 may instruct the first relay node 20a to modifying the frequency on which the first relay node 20a is transmitting on. Additionally or alternatively the processor 13 may instruct the first relay node 20a to change the timing of the first relay node's 20a transmissions.

The processor 13 then sends the instructions for modifying the configuration of the transmission parameters as shown in steps 420 and 522.

The first relay node 20a receives the configuration instructions and modifies the transmission parameters of the first relay node 20a accordingly. The processor 24 of the first relay node 20a reduces the transmission power to a lower target transmission power. Since the transmission power of the relay node 20a lowers the transmission power the level of interference incident at neighbouring relay nodes, for example the second relay node 20b, will be decreased.

The processor 24 configures the transmission power to gradually increase in increments until the transmission power of the first relay node 20a has returned to the original transmission power before the relay node 20a was instructed to lower the transmission power. The incremental increase of the transmission power may be configured by the first base station 12a via radio resource control (RRC) signalling.

If the configuration instruction instructs the relay node 20a to stop transmitting, the processor 24 of the relay node 20a prevents any transmission during certain sub-frames.

This means that backwards compatibility is provided by avoiding any scheduling in certain physical resource blocks or sub-frame sets.

In some embodiments the transmission power of common reference signals (CRS) and other system information can be reduced to minimise interference with neighbouring relay nodes. The base station 12a and the relay node 20a take into account variations in transmission power and may optimise communication device handover between base station cells and/or relay node cells accordingly.

The step of modifying the transmission parameters of the relay node is shown in steps 422 and 524 of FIGS. 7 and 8 respectively.

The method shown in FIGS. 7 and 8 may be repeated as shown by the arrow 524 in FIG. 8. The process of reducing interference may be continually carried out. Alternatively the process may be repeated periodically or initiated by a specific event such as receiving a request.

In some embodiments the previously describe embodiments may be backwards compatible with previous communication systems. For example some embodiments may be applied to Release 8 or Release 9 of the LTE specification.

In particular, Releases 8 and 9 use inter-cell interference co-ordination (ICIC) messages such as overload indicator (OI), high interference indicator (HII), relative narrowband transmit power (RNTP) for alleviating inter-cell interference for uplink. In some embodiments the first relay node 20a sends/receives ICIC messages to/from the second relay node 20b via the first and second base stations 12a, 12b. The first and second base stations 12a, 12b are configured to open the ICIC messages and determine information of interference between relay nodes. The first base station 12a, on determining the interference information of the first relay node 20a performs steps 520 and 522 as previously discussed in order to modify the transmission parameters of the first relay node 20a.

It is noted that whilst embodiments have been described in relation to LTE, similar principles can be applied to any other communication system where a carrier comprising a multiple of component carriers is employed. For example, some or all of the previous embodiment may be applied to universal mobile telephone system, UMTS. In this way, a controller entity may receive information relating to interference between a relay node and at least one other relay node and initiate modifying transmitting parameters of the relay node and/or the at least one other relay node on the basis of the information. The controller entity may be a radio network controller which is in communication with one or more base stations. The controller entity may communicate with relay nodes directly or via one or more base stations. In other embodiments the controller may receive information relating to one relay node via another relay node.

Also, instead of carriers provided by a base station a carrier comprising component carriers may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed in there is a further embodiment comprising a combination of one or more embodiments with any of the other embodiments previously discussed.

The invention claimed is:

1. A method comprising:
   receiving, by a first base station, an interference report on interference between a relay node associated with the first base station and at least one other relay node associated with a second base station;
   determining, by the first base station, transmission parameters of the backhaul sub-frame configurations of the relay node and the at least one other relay node on the basis of the interference report; and
   sending instructions, by the first base station, to modify the transmission parameters of the backhaul sub-frame configurations of at least one of the relay node and the at least one other relay node to mitigate the interference therebetween.

2. The method according to claim 1 further comprising at least one of:
   receiving from the second base station information relating to a backhaul sub-frame configuration set of the relay node and at least one other relay node; and
   transmitting to the second base station information relating to the backhaul sub-frame configuration set of the relay node and at least one other relay node.

3. The method according to claim 1 further comprising:
   sending the interference report to the second base station.

4. The method according to claim 1 further comprising:
   receiving, from the second base station, a second interference report on interference between the relay node and at least one relay node associated with the second base station.

5. The method according to claim 1 further comprising:
   determining, on the basis of the interference report, instructions for modifying transmission parameters of at least one of the relay node and the at least one other relay node.

6. The method according to claim 1 wherein the interference report comprises one or more of the following:
   average received interference between the relay node and the at least one other relay node, expected interference between the relay node and the at least one other relay node, and transmission power of the relay node.

7. The method according to claim 1 wherein the interference report comprises interference measurements between the relay node and the at least one other relay node.

8. The method according to claim 1 further comprising:
   sending instructions, by the first base station, to measure the interference between the relay node and the at least one other relay node.

9. The method according to claim 1 further comprising:
   sending to the second base station information regarding at least one relay node associated with the first base station for determining station information relating to interference between the relay node and at least one relay node associated with the second base station.

10. An apparatus, the apparatus being a first base station, comprising:
    at least one processor; and
    at least one memory including computer program code, the at least one memory and the computer program code configured, with the at least one processor, to cause the apparatus to perform at least the following:
    receive an interference report on interference between a relay node associated with the first base station and at least one other relay node associated with a second base station;
    determine transmission parameters of the backhaul sub-frame configurations of the relay node and the at least one other relay node on the basis of the interference report; and
    send instructions to modify transmission parameters of the backhaul sub-frame configurations of at least one of the relay node and the at least one other relay node to mitigate the interference therebetween.

11. The apparatus according to claim 10 wherein the at least one memory and the computer program code are further configured, with the at least one processor, to cause the apparatus to perform at least one of:
    receive from the second base station information relating to a backhaul sub-frame configuration set of the relay node and at least one other relay node; and
    transmit to the second base station information relating to the backhaul sub-frame configuration set of the relay node and at least one other relay node.

12. The apparatus according to claim 10 wherein the at least one memory and the computer program code are further configured, with the at least one processor, to send the interference report to the second base station.

13. The apparatus according to claim 10 wherein the at least one memory and the computer program code are further configured, with the at least one processor, to receive from the second base station a second interference report on interference between the relay node and at least one relay node associated with the second base station.

14. An apparatus according to claim 10 wherein the at least one memory and the computer program code are further configured, with the at least one processor, to determine, on the basis of the interference report, instructions for modifying transmission parameters of at least one of the relay node and the at least one other relay node.

15. The apparatus according to claim 10 wherein the interference report comprises one or more of the following:
average received interference between the relay node and the at least one other relay node, expected interference between the relay node and the at least one other relay node, and transmission power of the relay node.

16. The apparatus according to claim 10 wherein the interference report comprises interference measurements between the relay node and the at least one other relay node.

17. The apparatus according to claim 10 wherein the at least one memory and the computer program code are further configured, with the at least one processor, to send instructions to measure the interference between the relay node and the at least one other relay node.

18. The apparatus according to claim 10 wherein the at least one memory and the computer program code are further configured, with the at least one processor, to send to the second base station information regarding at least one relay node associated with the base station for determining station information relating to interference between the relay node and at least one relay node associated with the second base station.

* * * * *